(12) United States Patent
Asai et al.

(10) Patent No.: US 7,045,945 B2
(45) Date of Patent: May 16, 2006

(54) COLD CATHODE RAY FLUORESCENT TUBE AND LIQUID CRYSTAL DISPLAY DEVICE USING THE COLD CATHODE FLUORESCENT TUBE

(75) Inventors: Takahiro Asai, Fujisawa (JP); Kazuyuki Omura, Ichihara (JP)

(73) Assignees: Hitachi Displays, Ltd., Chiba-ken (JP); Hitachi Display Devices, Ltd., Chiba-ken (JP)

( * ) Notice: Subject to any disclaimer, the term of this patent is extended or adjusted under 35 U.S.C. 154(b) by 52 days.

(21) Appl. No.: 10/875,583

(22) Filed: Jun. 25, 2004

(65) Prior Publication Data

US 2005/0017627 A1    Jan. 27, 2005

(30) Foreign Application Priority Data

Jun. 30, 2003  (JP) .............................. 2003-186973

(51) Int. Cl.
*H01J 17/04*  (2006.01)

(52) U.S. Cl. ............ 313/491; 313/346 R; 313/346 DC; 313/631

(58) Field of Classification Search ........ 313/317–355, 313/346 R, 346 DC, 483–503, 567–636
See application file for complete search history.

(56) References Cited

U.S. PATENT DOCUMENTS

| | | | | |
|---|---|---|---|---|
| 3,906,271 A | * | 9/1975 | Aptt, Jr. ..................... | 313/491 |
| 5,646,472 A | * | 7/1997 | Horikoshi ................... | 313/635 |
| 5,847,497 A | * | 12/1998 | Mehrotra et al. ........... | 313/491 |
| 5,905,334 A | * | 5/1999 | Nakamura et al. .......... | 313/491 |
| 5,962,977 A | * | 10/1999 | Matsumoto et al. ........ | 313/491 |
| 5,982,088 A | * | 11/1999 | Hamada et al. ............. | 313/491 |
| 6,800,997 B1 | * | 10/2004 | Yamashita et al. .......... | 313/631 |
| 6,853,139 B1 | * | 2/2005 | Yamashita et al. .......... | 313/491 |
| 6,943,499 B1 | * | 9/2005 | Yamashita et al. .......... | 313/485 |

* cited by examiner

*Primary Examiner*—Joseph Williams
*Assistant Examiner*—Natalie K. Walford
(74) *Attorney, Agent, or Firm*—Reed Smith LLP; Stanley P. Fisher, Esq.; Juan Carlos A. Marquez, Esq.

(57) ABSTRACT

The present invention decreases invalid light emitting regions, which are generated at both ends of an outer tube and enlarges a valid light emitting region of a phosphor layer, which enlarges the light emitting region of a lighting device. In a cold cathode fluorescent tube, cup-shaped electrodes are provided on the inside of both ends of a glass tube, which has a phosphor layer on the inner surface thereof, wherein each cup-shaped electrode connects to an inner lead, which supplies an electric power. A sputter source is formed on an inner wall surface of the cup-shaped electrode by sintering white metal oxide, whereby the white metal oxide which constitutes a sputter source is sputtered by evaporation, which forms a sputter film on a portion of the opening end of the cup-shaped electrode and inner wall surface of the glass tube.

14 Claims, 2 Drawing Sheets

COLD CATHODE RAY FLUORESCENT TUBE AND LIQUID CRYSTAL DISPLAY DEVICE USING THE COLD CATHODE FLUORESCENT TUBE

BACKGROUND OF THE INVENTION

The present invention relates to a cold cathode fluorescent tube which enlarges an effective light emitting region and a liquid crystal display device using the cold cathode fluorescent tube, and more particularly to a cold cathode fluorescent tube which can be suitably used in a lighting device of a liquid crystal display device and a liquid crystal display device using the cold cathode fluorescent tube.

Among various lighting devices, a discharge tube has been popularly used as a light source which exhibits low power consumption, high luminance or has a small size. With respect to this discharge tube, a low-pressure discharge tube which seals an inert gas and mercury in the inside of an outer sheath tube made of a transparent insulation material such as glass which applies phosphor on an inner surface thereof has been well known as a fluorescent lamp. This type of low-pressure discharge tube is classified into a hot cathode type discharge tube which uses hot electrons and a cold cathode type discharge tube which uses cold electrons.

For example, as the light source of a lighting device of the liquid crystal display device, a cold cathode fluorescent lamp (CFL) which discharges cold electrons and excites the phosphor to emit light has been adopted. In general, an electrode which discharges cold electrons is made of a metal material such as nickel or the like. Since the electrode has the sputtering characteristics, the electrode is dissipated and is consumed. Accordingly, the electrode of the cold cathode fluorescent tube is required to ensure a certain degree of size. On the other hand, when the size of the electrode is increased, a surface area of the electrode is also increased and hence, the current density per unit are is lowered whereby a sputter quantity of the electrode material on an inner wall of the outer sheath tube at the time of discharging (particularly at the time of aging before shipping a product) is decreased.

In this type of cold cathode fluorescent tube, the shortening of the discharge start time (discharge starting time) is requested. Particularly, in a pitch dark, there has been a drawback that a delay is generated with respect to time for starting the discharge. There has been reported an advantageous effect that when a portion of the electrode which is made of a nickel material in general is sputtered on the inner wall of the outer sheath tube, the electrons induced from the sputter film shorten the discharge start time. In making use of a cup-shaped electrode, by setting an outer diameter of the electrode (particularly an outer diameter of an opening portion) smaller than an inner diameter of the outer sheath tube, sputtering of the electrode material onto the inner wall of the outer sheath tube is promoted. However, sputtering of the electrode material makes the electrode per se wear and hence, the lifetime of the electrode is shortened. Further, even when the sputtering film is formed using an aging step, the shortening of the discharge start time achieved by the aging step is not sufficient.

To decrease this delay of the discharge start time, it is effective to place a material which induces the discharge in the inside of the outer sheath tube (particularly at a portion close to the electrode). Accordingly, various methods including following methods have been adopted conventionally:

(1) A metal compound having high electron emission performance, for example, cesium compound such as cesium chromate is adhered to a surface of the electrode.

(2) Using a mixture of the above-mentioned metal compound having high electron emission performance such as the cesium compound and a mercury emission material, the metal compound having high electron emission performance such as the cesium compound or the like is dispersed in the inside of the tube at the time of heating the mercury for emission in manufacturing steps.

(3) The electrode is heated by supplying a high current (for example, approximately 8 to 15 mA when the outer diameter of the electrode is 1.7 mm) to the electrode thus dissipating a portion of the electrode material to form a sputter film on the inner wall of the outer sheath tube in the vicinity of the electrode.

(4) Alumina is added to the inside of a phosphor film.

As the specific means to decrease the delay of the discharge start time, a sputter film which contains metal or a metal compound as a main component is formed on the inner wall of the outer sheath tube in the vicinity of the cup-shaped electrode thus inducing the discharge due to cold electrons which are generated by a voltage applied to the electrode, whereby the discharge start time is shortened. Further, to increase an area of the electrode, the electrode is formed into a cup shape, a thin film containing the above-mentioned metal material is formed on an inner wall surface thereof, and the thin film containing the metal material is evaporated by heating to form the sputter film on the inner wall of the outer sheath tube in the vicinity of the electrode in an aging step. Here, with respect to this type of prior art, for example, Japanese Patent Laid-Open No. 76617/2001 (literature 1), Japanese Patent Laid-Open No. 231133/2002 (literature 2) and the like are named.

BRIEF SUMMARY OF THE INVENTION

However, with respect to the cold cathode fluorescent tube having such a constitution, metal oxide which is adhered to the inner wall surface of the cup-shaped electrode is formed of black metal fine particles and hence, a portion (a sputter film) which is sputtered on an inner wall of a glass tube in the vicinity of the cup-shaped electrode is formed as a black film on the phosphor layer. Accordingly, there has been a drawback that emission of light by the phosphor layer is interrupted, an invalid light emitting region (a region which does not contribute to emission of light which is generated at both ends in the longitudinal direction of the cold cathode fluorescent tube) is enlarged, and the light emitting region of the phosphor layer is narrowed resulting in the reduction of the effective light emitting area of the lighting device.

Further, with respect to a liquid crystal display device adopting the cold cathode fluorescent tube having such a constitution, the light emitting area of the lighting device as the light source is decreased and hence, the performance of the cold cathode fluorescent tube is lowered whereby the sufficient light from the light source is not imparted to the liquid crystal display panel. Accordingly, the liquid crystal display device can not hold the high quality images with high luminance for a long period.

Accordingly, the present invention has been made to overcome the above-mentioned drawbacks of the prior art and it is an object of the present invention to provide a cold cathode fluorescent tube which can reduce invalid light emitting regions generated at both ends of an outer sheath tube and can enlarge an effective light emitting region of a phosphor layer thus realizing the enlargement of a light emitting region of a lighting device and a liquid crystal display device which uses such a cold cathode fluorescent tube as a lighting device.

To achieve such an object, according to the cold cathode fluorescent tube of the present invention, cup-shaped electrodes are provided to the inside of both ends of an outer sheath tube which is made of a light transmitting insulation material and applies a phosphor layer on an inner surface thereof, wherein each cup-shaped electrode includes an opening portion at a discharge region side of the outer sheath tube and connects an inner lead which supplies an electric power from the outside of the outer sheath tube to an outer wall of a bottom portion formed on an end opposite to the opening portion by resistance welding, a sputter source is formed on an inner wall surface of the cup-shaped electrode by sintering a white metal oxide, whereby the white metal oxide which is formed on the inner wall surface of the cup-shaped electrode is sputtered by evaporation in an aging step so as to form a sputter film on a peripheral portion of the opening end of the cup-shaped electrode and an inner wall surface of the outer sheath tube in the vicinity of the cup-shaped electrode.

Further, according to the present invention, using aluminum oxide or yttrium oxide as the white metal oxide, a sputter film made of the white metal oxide is formed on the opening-end peripheral portion of the cup-shaped electrode and the inner wall surface of the outer sheath tube in the aging step.

Further, according to the present invention, as a material of the cup-shaped electrode, any one of molybdenum, tungsten and tantalum can be used and, as a material of the inner lead, any one of nickel-cobalt-iron alloy, tungsten, nickel and iron can be used.

The liquid crystal display device according to the present invention is constituted of a liquid crystal display panel and a lighting device which is arranged on a front surface or a back surface of the liquid crystal display panel and adopts the cold cathode fluorescent tube having the above-mentioned constitution as a light source of the lighting device and hence, an effective area of the lighting device is enlarged whereby images having high luminance and high quality can be realized.

Here, it is needless to say that the present invention is not limited to the above-mentioned constitution and the constitutions of respective embodiments described later and various modifications are conceivable without departing from the technical concept of the present invention.

DETAILED DESCRIPTION OF THE INVENTION

Here, preferred embodiments of the present invention are explained in detail in conjunction with drawings showing the embodiments hereinafter.

Figure 1:
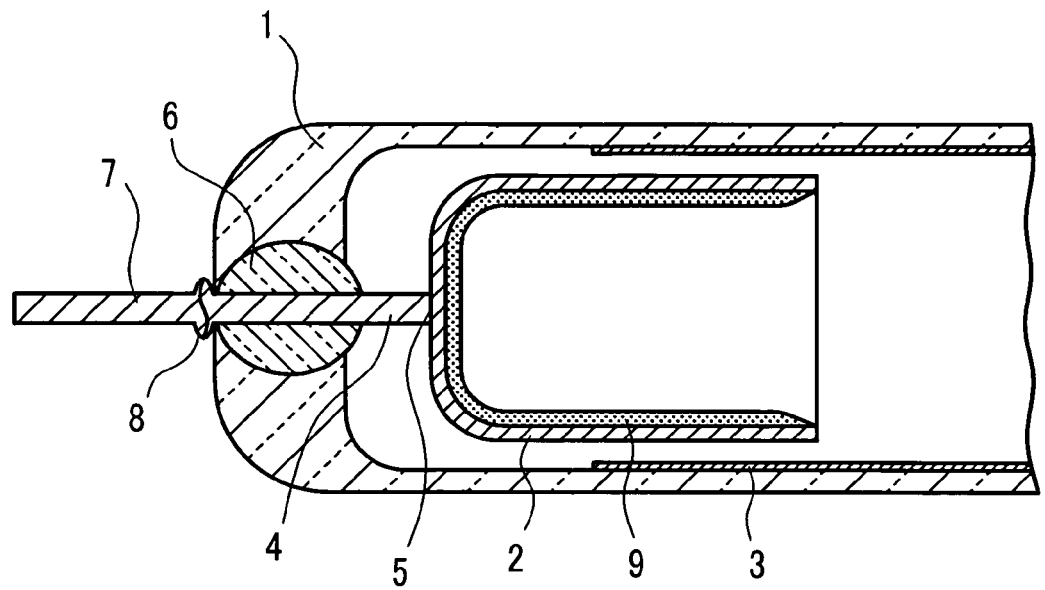
FIG. 1 is a cross-sectional view of an essential part showing the constitution according to one embodiment of a cold cathode fluorescent tube of the present invention.

FIG. 1 is a cross-sectional view of an essential part showing the constitution according to one embodiment of a cold cathode fluorescent tube according to the present invention. The cold cathode fluorescent tube is configured such that electrodes 2 are arranged in the inside of both ends of a light transmitting glass tube 1 which constitutes an outer sheath tube, wherein the electrodes 2 face each other in an opposed manner. In FIG. 1, only one end portion of the cold cathode fluorescent tube is shown.

A phosphor layer 3 is applied to an inner wall surface of the glass tube 1 by coating and the electrodes 2 are formed into a cup-shape by a press forming method using a nickel material, wherein an opening portion which is formed at one end of the electrode 2 is directed to or faces a main discharge region (a region between both electrodes: hereinafter, also simply referred to as a discharge region), while an inner lead 4 made of nickel-cobalt-iron alloy which is metal having a thermal expansion coefficient close to a thermal expansion coefficient of glass is bonded to an outer wall of a bottom portion thereof by a resistance welding method such as but welding thus establishing an electrical connection with the electrode 2. Here, numeral 5 indicates a resistance welding portion.

The inner lead 4 is supported by a glass lead 6 and penetrates the glass tube 1 while ensuring a hermetic state between the inside and the outside of the glass tube 1. The glass bead 6 is deposited by melting to an end portion of the glass tube 1 thus forming a sealing portion in the glass tube 1, and an outer lead 7 which is formed of a nickel wire or the like is bonded to the inner lead 4 projected to the outside from the glass tube 1 at a welding portion 8 by laser welding or the like, for example. The outer lead 7 is connected to a power source circuit (generally an inverter) not shown in the drawing so as to supply lighting power to the cup-shaped electrode 2.

Further, on an inner wall surface of the cup-shaped electrode 2, a sputter source 9 which is formed by sintering, for example, aluminum oxide ($Al_2O_3$) as white metal oxide is formed. The sputter source 9 is formed such that a solution which is produced by dispersing white powder made of aluminum oxide into an organic solvent such as butyl acetate, for example, is filled in and applied to the inside of the cup-shaped electrode 2 using a dispenser and, thereafter, the solution is baked to evaporate the organic solvent, and the aluminum oxide is sintered to make the oxide aluminum remain on the inner wall surface of the cup-shaped electrode 2.

Figure 2:
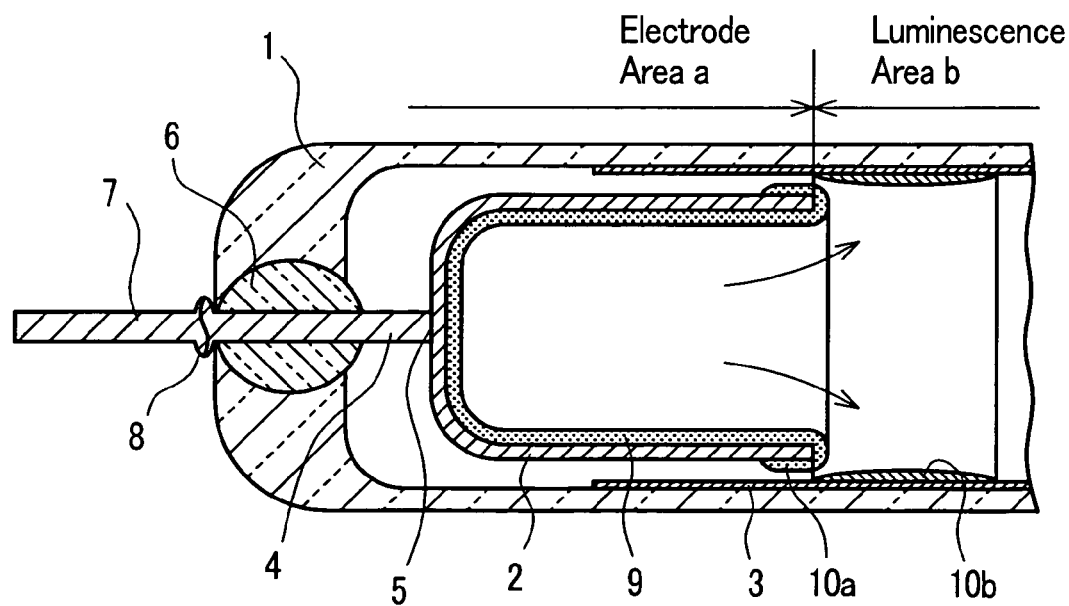
FIG. 2 is a cross-sectional view of an essential part showing the constitution of the cold cathode fluorescent tube shown in FIG. 1 after an aging step.

With respect to the sputter source 9 which is formed in this manner, in the aging step of the cold cathode fluorescent tube, the white aluminum oxide which is formed on the inner wall surface of the cup-shaped electrode 2 to form the sputter source 9 is evaporated for sputtering in the direction shown by arrows in FIG. 2. Accordingly, the white aluminum oxide is dispersed and scattered in a form of white-colored fine particles and is adhered and coagulated to an opening end periphery portion of the cup-shaped electrode 2 and the phosphor layer 3 which is preliminarily formed on an inner wall surface of the glass tube 1 in the vicinity of the cup-shaped electrode 2 respectively thus forming approximately white transparent sputter films 10a, 10b with surfaces having fine rough surfaces respectively.

The sputter source 9 formed in this manner becomes a sputter source in place of the inner wall surface of the cup-shaped electrode 2 during aging of the cold cathode fluorescent tube and during a lighting operation which follows aging. Then, as shown in FIG. 2, the sputter film 10a is gradually formed on the opening end peripheral portion of the cup-shaped electrode 2 in an electrode region "a" and, at the same time, the sputter film 10b is extended from the opening of the cup-shaped electrode 2 to the center side of a light emitting region "b" according to a cumulative lighting time of the cold cathode fluorescent tube. At this point of time, although there may be a case that a sputter film made of a nickel material which forms the cup-shaped electrode 2 is formed on the inner wall surface of the glass tube 1 irrespective of the electrode region "a" and the light emitting region "b", since the sputtering by the sputter source 9 is superior, a sputtering amount of the nickel material is suppressed to an ignorable amount.

The sputter films 10a, 10b which are formed in such a manner enhance the emission of the cold electrons in a state that the capture of mercury which is sealed in the glass tube 1 and contributes to the light emitting operation is restricted.

In such a constitution, by connecting the cup-shaped electrode 2 and the inner lead 4 using a resistance welding method such as butt welding or the like, during the aging step and the lighting after the aging step, the scattering of black metal fine particles which form the cup-shaped electrode 2 onto the phosphor layer 3 which has occurred conventionally can be suppressed and hence, the sputtering of materials to be sputtered is drastically reduced whereby the number of cases that the invalid light emitting region is formed on the phosphor layer 3 becomes extremely small and the valid light emitting region is enlarged correspondingly.

Further, in such a constitution, with the use of the sputter source 9 which is formed of the sintered body made of aluminum oxide, the sputtering is facilitated with the aging of short time in the manufacturing step and the substantially white transparent sputter films 10a, 10b can be formed. Accordingly, the light emission of the phosphor layer 3 is not restricted and the valid light emitting region can be enlarged. Accordingly, the valid light emitting region can be enlarged inexpensively without shortening the lengths of the cup-shaped electrode 2 and of the inner lead 4 in the tube axis direction.

Further, in such a constitution, by providing the sputter source 9 formed of the sintered body made of aluminum oxide to the inner wall surface of the cup-shaped electrode 2, the substantially white transparent sputter films 10a, 10b are formed on the opening end peripheral portion and the phosphor film 3 of the cup-shaped electrode 2 after sputtering and hence, a region which conventionally forms an invalid light emitting region as a black sputter film on the phosphor film can be formed into the substantially white transparent valid light emitting region. Accordingly, the valid light emitting region can be enlarged correspondingly within a range of approximately 4 mm to 5 mm at both end portions of the glass tube 1.

Further, in a light source device which is constituted by arranging a plurality of cold cathode fluorescent tubes having such a constitution, no invalid light emitting regions are formed at both end portions of each individual cold cathode fluorescent tube and the light emitting area can be largely enlarged and hence, the light source device having high light emitting efficiency can be realized.

Figure 3:
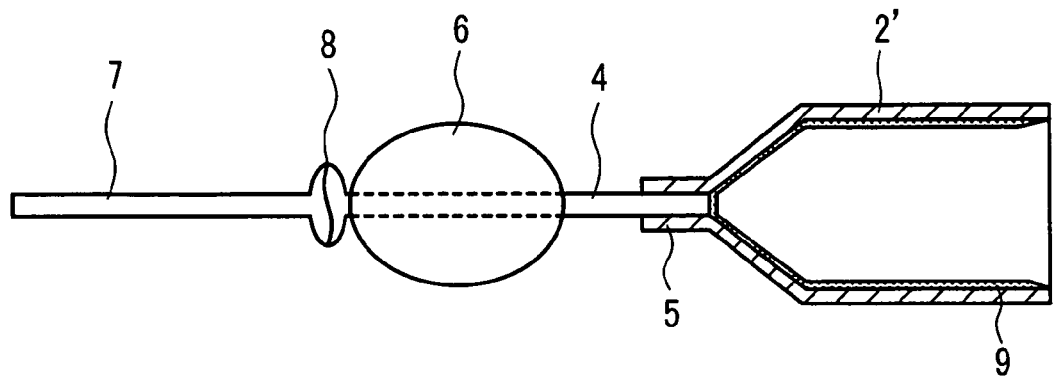
FIG. 3 is a cross-sectional view of an essential part showing the constitution of a cup-shaped electrode of another embodiment of the cold cathode fluorescent tube according to the present invention.

Here, in the above-mentioned embodiment, with respect to the shape of the electrode, the case in which the cup-shaped electrode 2 which has the inner lead bonded to the bottom outer wall of the electrode body by resistance welding is used is explained. However, by adopting a sleeve-type cup electrode 2' shown in FIG. 3 which is a cross-sectional view of an essential part and by forming the sputter source 9 on the inner wall surface of the cup electrode 2', it is also possible to obtain the exactly same advantageous effects as the above-mentioned advantageous effects. That is, in FIG. 3, an opening is formed in a bottom portion of an electrode body, a distal end portion of the inner lead 4 is made to penetrate the inside of the opening, and contact portions are bonded to each other by a butt welding method. Here, in the drawing, numeral 5 indicates a welded portion.

Further, in the above-mentioned embodiment, the case in which aluminum oxide is used as white metal oxide constituting the sputter source is explained. However, the present invention is not limited to such a constitution and the exactly same advantageous effect as the above-mentioned advantageous effect can be obtained when yttrium oxide is used instead of aluminum oxide. Further, a compound of aluminum oxide and yttrium oxide may be used. Still further, it is needless to say that with the use of the metal oxide which exhibits white color, gray color or the mixed color of these colors, the exactly same advantageous effects as the above-mentioned advantageous effects can be obtained.

Further, in this embodiment, the case in which nickel is used as the material of the cup-shaped electrode is explained. However, the present invention is not limited to such a constitution and metal having a high melting point such as molybdenum, tungsten, tantalum or the like may be used. Further, in this embodiment, the case in which the nickel-cobalt-iron alloy is used as the material of the inner lead is explained. However, it is needless to say that the present invention is not limited to such a constitution and with the use of tungsten, nickel alloy, iron alloy or other wire material, the exactly same advantageous effects as the above-mentioned advantageous effect can be obtained.

Figure 4:
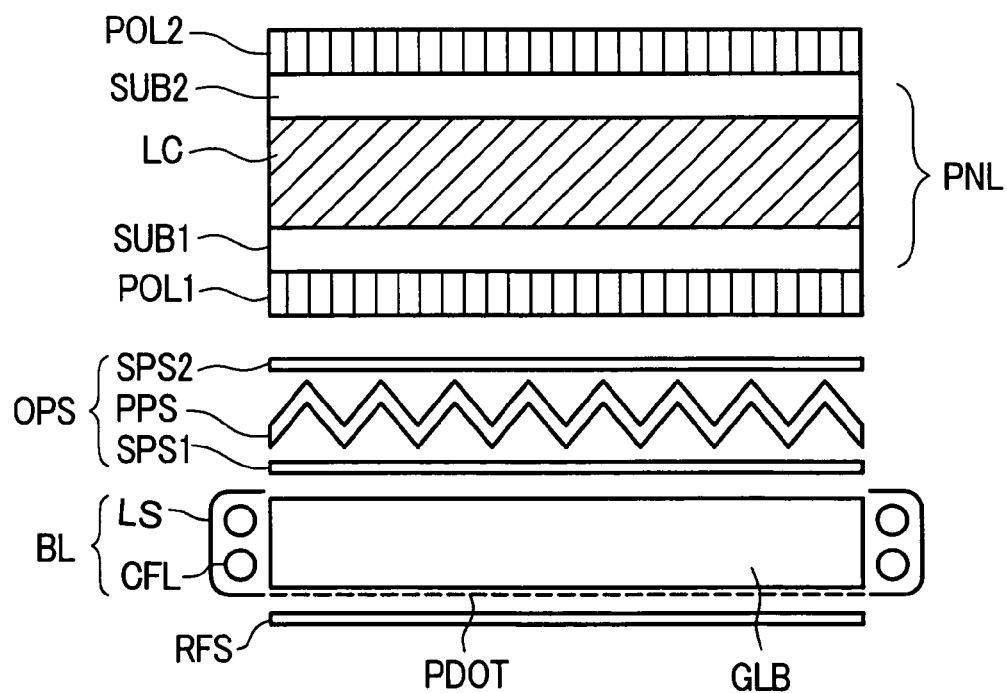
FIG. 4 is a developed view for explaining the constitution of one embodiment of a liquid crystal display device according to the present invention.

FIG. 4 is a developed perspective view for explaining the whole constitution according to one embodiment of the liquid crystal display device of the present invention. In FIG. 4, as the liquid crystal display device, a so-called side edge type lighting device is adopted. Here, a lighting device BL is arranged on the back of the liquid crystal display PNL by way of an optical compensation sheet OPS. The liquid crystal display panel PNL is constituted such that a liquid crystal layer LC is sandwiched between a first substrate SUB1 and a second substrate SUB2 and polarization plates POL1, POL2 are stacked respectively on front surface sides of respective substrates. The optical sheet OPS of this embodiment is configured by stacking a first expansion plate SPS1, a prism sheet PRS and a second expansion plate SPS2. However, the optical sheet OPS of this embodiment is not limited to such a constitution.

The lighting device BL is constituted such that two cold cathode fluorescent tubes CFL are mounted respectively along two sides of a planar-plate-like light guiding plate GLB which face each other in an opposed manner and, as the cold cathode fluorescent tube CFL, the cold cathode fluorescent tube having the constitution explained in the above-mentioned FIG. 1 or FIG. 2 is used. At the sides of respective cold cathode fluorescent tubes CFL opposite to the light guiding plate GLB, so-called lamp reflection sheets LS are respectively provided thus enhancing the utilization ratio of the light emitted from the cold cathode fluorescent tubes CFL. On the back of the light guiding plate GLB, reflection dots PDOT are printed and, at the same time, a reflection sheet RFS is arranged. On the periphery of the liquid crystal display panel PNL, circuit elements (drivers) for driving the liquid crystal display device are arranged. Further, circuit boards on which a control circuit and the like are mounted are also provided to the periphery of the liquid crystal display panel PNL. However, these parts are omitted from the drawing.

Due to such a constitution, by enlarging the valid light emitting region of the cold cathode fluorescent tube, the light emitting area of the lighting device BL which lights the liquid crystal display panel PNL is further enlarged and hence, the image display of high quality and high luminance can be realized.

Further, it is needless to say that the cold cathode fluorescent tube according to the present invention is applicable as a light source of various lighting devices such as a PDP (a plasma display panel) and an FPD (a flat panel display) besides the application thereof as the light source of the lighting device adapted to the above-mentioned liquid crystal display device for a liquid crystal television or a liquid crystal monitor.

As has been explained heretofore, according to the present invention, the invalid light emitting regions which are generated at both end portions of the outer sheath tube can be reduced and the valid light emitting region can be enlarged. Accordingly, it is possible to inexpensively obtain the extremely advantageous effects including an advantageous effect that the valid light emitting region can be enlarged without preventing the light emission of the phosphor layer.

Further, with the use of the cold cathode fluorescent tube having such a constitution as the light source of the lighting device of the liquid crystal display device, the light emitting area can be enlarged. Accordingly, without changing the length of the outer sheath tube and the shape of the housing body which holds the phosphor display panel, image display with high luminance and high quality can be held for a long period. Further, by enlarging the light emitting area of the lighting device, the extremely advantageous effects including the advantageous effect that the lighting device can be used for a liquid crystal display monitor having a small picture frame such as a mobile terminal or the like, for example.

What is claimed is:

1. A cold cathode fluorescent tube comprising:
   an outer sheath tube which is made of a light transmitting insulation material and applies a phosphor layer on an inner surface thereof; and
   cup-shaped electrodes which are provided to the inside of both ends of the outer sheath tube, each cup-shaped electrode including an opening portion at a discharge region side of the outer sheath tube and connects an inner lead which supplies an electric power from the outside of the outer sheath tube to an outer wall of a bottom portion formed on an end opposite to the opening portion, wherein
   the cold cathode fluorescent tube further includes a sputter source which is formed on an inner wall surface of the cup-shaped electrode by sintering a white metal oxide.

2. A cold cathode fluorescent tube according to claim 1, wherein the white metal oxide which constitutes the sputter source is aluminum oxide.

3. A cold cathode fluorescent tube according to claim 1, wherein the white metal oxide which constitutes the sputter source is yttrium oxide.

4. A cold cathode fluorescent tube according to claim 1, wherein a material of the cup-shaped electrode is one selected from a group consisting of molybdenum, tungsten and tantalum and a material of the inner lead is one selected from a group consisting of nickel-cobalt-iron alloy, tungsten, nickel and iron.

5. A cold cathode fluorescent tube according to claim 1, wherein the inner lead is bonded by resistance welding.

6. A cold cathode fluorescent tube according to claim 2, wherein a material of the cup-shaped electrode is one selected from a group consisting of molybdenum, tungsten and tantalum and a material of the inner lead is one selected from a group consisting of nickel-cobalt-iron alloy, tungsten, nickel and iron.

7. A cold cathode fluorescent tube according to claim 3, wherein a material of the cup-shaped electrode is one selected from a group consisting of molybdenum, tungsten and tantalum and a material of the inner lead is one selected from a group consisting of nickel-cobalt-iron alloy, tungsten, nickel and iron.

8. A liquid crystal display device including a liquid crystal display panel and a lighting device which is arranged on a back surface or a front surface of the liquid crystal display panel, wherein, a light source of the lighting device is configured to have a cold cathode fluorescent tube, and the cold cathode fluorescent tube comprises an outer sheath tube which is made of a light transmitting insulation material and applies a phosphor layer on an inner surface thereof, and a cup-shaped electrodes which are provided to the inside of both ends of the outer sheath tube, each cup-shaped electrode including an opening portion at a discharge region side of the outer sheath tube and connects an inner lead which supplies an electric power from the outside of the outer sheath tube to an outer wall of a bottom portion formed on an end opposite to the opening portion, wherein the cold cathode fluorescent tube further includes a sputter source which is formed on an inner wall surface of the cup-shaped electrode by sintering white metal oxide.

9. A liquid crystal display device according to claim 8, wherein the white metal oxide which constitutes the sputter source is aluminum oxide.

10. A liquid crystal display device according to claim 8, wherein the white metal oxide which constitutes the sputter source is yttrium oxide.

11. A liquid crystal display device according to claim 8, wherein a material of the cup-shaped electrode is one selected from a group consisting of molybdenum, tungsten and tantalum and a material of the inner lead is one selected from a group consisting of nickel-cobalt-iron alloy, tungsten, nickel and iron.

12. A liquid crystal display device according to claim 8, wherein the inner lead is bonded by resistance welding.

13. A liquid crystal display device according to claim 9, wherein a material of the cup-shaped electrode is one selected from a group consisting of molybdenum, tungsten and tantalum and a material of the inner lead is one selected from a group consisting of nickel-cobalt-iron alloy, tungsten, nickel and iron.

14. A liquid crystal display device according to claim 10, wherein a material of the cup-shaped electrode is one selected from a group consisting of molybdenum, tungsten and tantalum and a material of the inner lead is one selected from a group consisting of nickel-cobalt-iron alloy, tungsten, nickel and iron.

* * * * *